United States Patent
Eisen et al.

(10) Patent No.: US 7,787,329 B2
(45) Date of Patent: Aug. 31, 2010

(54) BORE-BOX LOCATING SYSTEM

(75) Inventors: Stephan Eisen, Au SG (CH); Hanspeter Fischer, Landskron (AT)

(73) Assignee: UCTec Beteiligungsgesellschaft AG, St. Gallen (CH)

( * ) Notice: Subject to any disclaimer, the term of this patent is extended or adjusted under 35 U.S.C. 154(b) by 619 days.

(21) Appl. No.: 10/579,347

(22) PCT Filed: Oct. 29, 2004

(86) PCT No.: PCT/EP2004/052739

§ 371 (c)(1),
(2), (4) Date: Apr. 13, 2007

(87) PCT Pub. No.: WO2005/047921

PCT Pub. Date: May 26, 2005

(65) Prior Publication Data

US 2007/0273586 A1    Nov. 29, 2007

(30) Foreign Application Priority Data

Nov. 12, 2003   (DE) ............................... 103 52 774

(51) Int. Cl.
*G01S 3/80* (2006.01)
(52) U.S. Cl. .................................... 367/127
(58) Field of Classification Search ................. 367/127
See application file for complete search history.

(56) References Cited

U.S. PATENT DOCUMENTS

| | | | |
|---|---|---|---|
| 4,247,922 A * | 1/1981 | Jackson et al. ................. | 367/6 |
| 5,280,457 A * | 1/1994 | Figueroa et al. ............. | 367/127 |
| 5,491,670 A | 2/1996 | Weber | |
| 5,748,106 A | 5/1998 | Schoenian et al. | |
| 5,889,490 A * | 3/1999 | Wachter et al. ............. | 342/127 |
| 6,292,106 B1 | 9/2001 | Solinsky et al. | |
| 6,348,908 B1 | 2/2002 | Richley et al. | |
| 6,433,689 B1 | 8/2002 | Hovind et al. | |
| 6,553,013 B1 | 4/2003 | Jones et al. | |
| 2006/0233046 A1 * | 10/2006 | Fluhler et al. ................. | 367/11 |

FOREIGN PATENT DOCUMENTS

JP      06-317664      11/1994

(Continued)

OTHER PUBLICATIONS

Loon et al., "A Navigation System Which Uses Ultrasonic Transponders," Nanyang Technological Institute, Singapore, *Advanced Robotics*, 1991, "Robots in Unstructured Environments," 91 ICAR, Fifth International Conference, (www.ieeexplore.ieee.org, Sep. 15, 2004.).

(Continued)

*Primary Examiner*—Thomas H Tarcza
*Assistant Examiner*—Luke D Ratcliffe
(74) *Attorney, Agent, or Firm*—Collard & Roe, P.C.

(57) ABSTRACT

A locating arrangement has ultrasonic transmitters strung along a straight section. The use of the ultrasonic transmitters for determining a location along the section is possible with a high spatial resolution and for a multiplicity of identification units.

27 Claims, 6 Drawing Sheets

FOREIGN PATENT DOCUMENTS

| | | |
|---|---|---|
| JP | 07-098371 | 4/1995 |
| JP | 2001-337157 | 12/2001 |
| KR | 2003-93387 | 11/2003 |
| WO | WO 97/08990 | 3/1997 |
| WO | WO 01/34264 A1 | 5/2001 |
| WO | WO 2004/051303 A1 | 6/2004 |

OTHER PUBLICATIONS

Office Action dated Sep. 28, 2007, for Korean Patent Application No. 2006-7009332.

Office Action (Translation of Notice of Reasons for Refusal) in the Japanese Patent Office for corresponding JP Application No. 2006-538838.

* cited by examiner

FIG 6

| Stage | Description | Ref |
|---|---|---|
| Propagation time determination and feedback by DisTag | Propagation time measurement of the received US signals by the DisTag (example: TagID 123; Time slot 13=12 ms; Time slot 18=14 ms). | 500 |
| | Feedback of the propagation times by the DisTag in the form of a telegram (example: TagID 123; Time slot 13=12 ms; Time slot 18=14 ms). | 502 |
| Field strength measurement | Measurement of the field strengths of the received DisTag telegrams at the individual RF antennas (example: TagID 123; Rf 0207=45 dB; RF 0206=30 dB). | 504 |
| Coarse localization by BTS server | Field strength of the DisTag at strongest RF antenna (with maximum 1) >10 dB + Field strength (maximum 2) of the DisTag at RF antenna (with maximum 2) | 506 |
| | True → Assignment of a telegram of a DisTag to an RF antenna in the layout of the building: (US antenna a at the RF antenna 07 in the finger 02) | 508 |
| | False → Aggregation of the field strengths and determination of the centroid in the RF antenna grid or waiting for next measured value | 510 |
| Fine localization by BTS server | Determination of the relevant spatial coordinates of the US antennas on the basis of the layout data | 512 |
| | Fine localization by simplified trilateration on the basis of the layout data and propagation times (TagID 123; location text: finger 02; 34.5 meters) | 514 |
| Publication decision by BTS server | Location of DisTag 123 (t) not identical to location of DisTag (t-1) | 516 |
| | True → Publish the new location of the batch and store it in the database. | 518 |
| | False → No publication | 520 |

BORE-BOX LOCATING SYSTEM

PRIORITY CLAIM

The present application is a national stage application under 35 U.S.C. § 371 of PCT Application Serial No. PCT/EP2004/052739, filed Oct. 29, 2004, and also claims the benefit of priority of German Patent Application No. 103 52 774.5, filed Nov. 11, 2003, both of which are hereby incorporated by reference.

BACKGROUND

1. Technical Field

The disclosure relates to a locating arrangement. In particular, the disclosure relates to a locating arrangement which can be used to determine the position of at least one identification unit.

2. Background Information

An identification unit may be connected to a manufacturing batch containing a plurality of workpieces that are to be processed in the same way, e.g. semiconductor wafers. A batch may contain e.g. approximately 50 or 25 semiconductor wafers, i.e. two racks or one rack.

Locating in the near range with electromagnetic waves, such as radio waves or light or infrared light, is technically possible but complicated in terms of circuitry because excessively stringent requirements are made of the processing times of the circuit on account of the short signal propagation times. Ultrasound having a propagation speed in air at room temperature of approximately 340 m/s is more suitable. Propagation times of the signals in the near range are thus e.g. less than 50 milliseconds. Such propagation times can be detected with a tenable circuitry outlay.

The locating arrangement according to the invention therefore contains a plurality of ultrasonic transmitters strung along a path, e.g. at least three, six or nine ultrasonic transmitters. The distance between adjacent ultrasonic transmitters in the series is more than one meter. By virtue of this measure, transmitters can still be installed with a tenable outlay even along a path of up to several hundred meters. The actual measurement only ever requires the two nearest or only very few transmitters in the vicinity of the object to be located.

The determining method for determining the position is particularly simple if, in one development, the transmitters are strung along a straight section at mutually uniform distances between mutually adjacent transmitters. The calculation method is then in particular independent of the location, i.e. always the same for different locations.

In one development, the distance has a value in the range of from three meters to one meter, in particular a value of 1.6 meters. The values mentioned are a particularly good compromise between a small number of ultrasonic transmitters, high spatial resolution and short propagation time determination.

In a next development, the transmitters are arranged along an aisle, in particular along an aisle in a factory building. Semiconductor wafers or other substrates for integrated electronic circuits are preferably processed in the factory building.

In another development, the locating arrangement contains a drive unit, which drives the transmitters in accordance with a pulsed operating mode in which ultrasonic pulses are transmitted between transmission pauses. Ultrasonic pulses are particularly well suited to the locating process.

In a next development, the drive unit works cyclically, drive signals which instigate the transmission of ultrasonic pulses being generated for the transmitters. A cycle contains at least two sections in each of which a different portion of the transmitters is driven. By virtue of this measure, the propagation times from different transmitters can be determined successively without mutual interference. The number of sections per cycle depends on a plurality of parameters, e.g. the required repetition rate, the locating accuracy, the time required for communication, and on hardware conditions, e.g. 12 ultrasonic transmitters are connected to one drive unit, so that multiples of 12 are preferably chosen. A suitable number of cycles is e.g. 36 cycles or 48 cycles.

In a next development, the drive unit preferably contains a plurality of group drive units which in each case generate the drive signals for a plurality of transmitters depending on an input signal. The drive complexity can thereby be reduced.

In one development, at least three further US transmitters are strung along a further straight section at mutually identical distances between mutually adjacent transmitters. If the two paths lie parallel to one another, then locations in parallel aisles can be detected in a simple manner. However, a two-dimensional location detection is also possible, one coordinate lying along a path and the other coordinate depending on the path from which locating is effected.

In one development, at least two transmitters on different paths transmit simultaneously, so that instances of influencing are precluded or greatly reduced. This can be achieved in particular if more than one transmitter or more than three transmitters or more than six transmitters, relative to one of the two paths, lie between the two simultaneously transmitting transmitters after a parallel displacement of one path to the other path.

In a next development, a region into which no ultrasonic signal of the transmitters or only a greatly attenuated ultrasonic signal penetrates lies between the two paths. The region is e.g. a further aisle between two aisles in which locating is effected. Thus, in semiconductor fabrication facilities, maintenance aisles are arranged between clean room aisles. No wafers are located in the maintenance aisles.

In one development, there are at least three further US transmitters strung along a straight main section at mutually identical distances between mutually adjacent transmitters, the main section lying transversely with respect to at least two secondary sections, in particular at an angle of 90 degrees. As a result, locating can also be performed in a main aisle that connects the transverse aisles.

In one development, the locating arrangement contains at least three radiation receivers, in particular receivers for electromagnetic radiation, such as RF (radiofrequency) or radio receivers or infrared receivers, strung along a straight section at mutually identically distances between mutually adjacent radiation receivers. The distance between adjacent receivers is at least twice as large as the distance between adjacent transmitters. In one refinement, the receivers serve for communication with the objects to be located. The communication must be effected as rapidly as possible, with the result that ultrasound would be too slow. In one refinement, the receivers are additionally utilized for a coarse localization, reception levels being evaluated in place of propagation times. As a result, the circuitry outlay is also low in the case of the coarse localization.

In one refinement, the distance between the receivers lies in the range of from three meters and up to seven meters. As a result, it is always possible to determine a receiver whose reception signal, with respect to a unit to be localized, is considerably greater than that of the other receivers, so that the coarse localization can be carried out simply and reliably.

If, in one refinement, the receivers are arranged on the same sections as the transmitters, then the assembly outlay is low. If one receiver is in each case arranged between two transmitters, preferably at the same distance from the two transmitters, then shadowing is low.

In one development, there are a plurality of connection units at each of which a plurality of antenna modules are operated, an antenna module preferably containing a reception antenna and a plurality of transmitters, e.g. three transmitters. In one refinement, the connection units are connected via a local data transmission network e.g. via an Ethernet. The modular construction enables easy adaptation to different spatial conditions.

In a next development, the ultrasonic transmitters and the RF antennas are fixed to a ceiling or to ceiling transverse bracing.

In one development, the locating arrangement contains at least 1000 or at least 1500 identification units which have mutually different identifications and which are arranged in the acoustic irradiation range of the transmitters. By way of example, in a factory building there are the abovementioned number of receptacle containers to be located for a plurality of substrates for integrated circuits.

The invention additionally relates to an identification unit containing a memory unit, in which is stored an identification which distinguishes the identification unit from other identically constructed identification units. The identification unit additionally contains an ultrasonic receiver, a radiation transmitter, a radiation receiver and a control unit. The control unit carries out an ultrasound propagation time measurement depending on a synchronization signal received by the radiation receiver and transmits the result toward the outside with the aid of the radiation transmitter.

In one refinement, the identification unit contains a power-saving bistable character display unit, which displays the content to be represented even after the operating voltage has been switched off. As an alternative or in addition, the identification unit contains at least one luminous unit that can be driven via the radiation receiver, e.g. a light-emitting diode. The luminous unit identifies e.g. manufacturing units that are to be processed preferentially or particularly quickly. An identification unit currently sought can also be distinguished from other identification units by means of the luminous unit, in particular by means of a flashing luminous unit, even from several meters, thereby considerably facilitating the search even if the location is approximately known. By way of example, the identification unit sought can easily be picked out from three identification units within a radius of half a meter. The search enquiry is input e.g. via a drive unit.

The invention additionally relates to a location determining method, having the following steps:

constructing a locating arrangement comprising a plurality of ultrasonic transmitters along at least one path, constructing at least two radiation receivers or radiation transmitters that in each case receive radiation from at least one region irradiated with sound by a transmitter, introducing at least one identification unit into a region irradiated with sound by at least two transmitters, carrying out an ultrasonic propagation time measurement from at least two transmitters to the identification unit and determining at least one propagation time datum, determining a fine position of the identification unit depending on the propagation time datum, determining a coarse position of the identification unit with the aid of at least two radiation transmitters or radiation receivers, combining the fine position and the coarse position to form a location datum.

A powerful locating method is produced which is suitable in particular for use in semiconductor fabrication facilities.

In one development of the method, the following steps are carried out:

determining the fine position by trigonometrical calculations in a plane which contains a section in which the ultrasonic transmitters are strung and which contains the identification unit, determining a fine position by means of only one spatial coordinate.

In comparison with a three-dimensional or two-dimensional locating process that is not always necessary, the one-dimensional locating process thus carried out can be carried out very accurately and with a low outlay.

The invention additionally relates to a batch box localization system, having a locating arrangement, which extensively detects the transport paths for a plurality of batch boxes between a plurality of manufacturing installations and locates the batch boxes with an accuracy of less than two meters or less than one meter. In particular, the locating arrangement according to the invention or one of its developments is used in the batch box localization system.

In one development, the batch box localization system contains a communication system that outputs manufacturing data and/or transport data to output units fixed to the batch boxes.

As a result, it is possible not just to collect location information and output information during the storage time of the batch boxes, e.g. on a shelf, but to dynamically support the entire transport process. The crucial principle for this is the linear concept of the antenna and transmitter installation, in particular in the center along the longitudinal axis of an aisle or a so-called finger. By virtue of this principle, the antenna density can be reduced to an extent such that the required performance of an extensive localization and of a location-independent communication is achieved. The low antenna density makes it possible to achieve, in a synchronous communication protocol which is used between the RF antennas (radiofrequency), the ultrasonic transmitters and the identification units and in which one cycle is subdivided into fixed time segments, a time saving of more than 70 percent for the fine localization by means of ultrasound, so that 70 percent of the time remains for communication processes via radio.

It becomes possible to localize a batch box along the finger longitudinal axis to an accuracy of a few centimeters. By contrast, it is not possible to effect a position determination with regard to the position in terms of the height and the width of an aisle or finger, i.e. a three-dimensional location indication. However, a three-dimensional location indication is not actually necessary for the directing function during transport since the accurate localization of a batch box is possible e.g. through the possibility of an optical signaling in the form of a flip dot or a flashing or continuously illuminated LED or lamp at the identification unit.

Consequently, the antenna modules that can be mounted along a geometrical line crucially increase the performance of the overall system, can be mounted in a simple manner and are largely independent of shelf rearrangements or relatively small conversions of the production building.

The invention thus solves the technical problem of planning, control, optimization and monitoring of the transport process in flexible production, in particular wafer production.

The wafer boxes are transported automatically, e.g. by means of a conveyor belt, or manually, e.g. by means of transport carts. In the case of a production program oriented in customized fashion, the use of fully automatic, rigid transport systems often cannot be implemented with a tenable outlay on account of the lack of flexibility of the transport processes and the high capital expenditure. This limitation is now overcome because both extensive localization and suitable outputting of transport directing and manufacturing information, per batch box, are carried out at any desired point in time in the transport process, with the result that controlling interventions by operators are possible at any time. This possibility is also referred to as a paperless fabrication facility. It is thus possible e.g. to transport an urgent batch through manufacturing in an uncomplicated manner.

The invention specifies, in particular, an integrated transport directing and manufacturing information system which integrates both the path stipulation for manual transport on the basis of a fine localization of the batch boxes by radio and ultrasonic technology in the entire production building and the information and routing outputting for efficient delivery or for efficient transport of the batch box to the next manufacturing operation. Communication to the operators is carried out e.g. via a radio transponder with a bistable display that is fixed to the batch box.

As explained in even greater detail further below, the system comprises e.g. the following components:

identification unit or DisTag (distance transponder, distance tag) as an active radio transponder with an integrated ultrasonic receiver for fine localization and a bistable display for displaying data, antenna modules that are extensive and modular and contain RF antennas and ultrasonic transmitters and also integrated control devices, data processing system or box tracking server for controlling the extensive localization and dynamic communication—comprehending the transport path—with the DisTag for information outputting of the transport directing and manufacturing information.

Because of the extensive accurate detection of the spatial positions of the wafer boxes and also the communication possible at any point in time by means of the handover principle within the manufacturing building, the solution affords in particular the following advantages:

extensive accurate localization with an accuracy down to a few centimeters, outputting of the manufacturing and transport directing information at any time in decentralized fashion at the location of occurrence, i.e. e.g. at the batch box (paperless fab), outputting of an item of dynamic status information, e.g. reservation, batch message or urgent batch, which assists handling processes since the information is displayed directly at the batch box itself (paperless fab), the manufacturing turnaround time can be shortened through minimization of search, transport and storage operations of the batch boxes and the optimization of the capacitor utilization of the manufacturing machines that is placed thereon, an extensive localization function in conjunction with a greatly reduced installation outlay becomes possible on account of the high range of RF and ultrasonic technology.

BRIEF SUMMARY

A locating arrangement includes a plurality of ultrasonic transmitters strung along a path, such as at least three, six or nine ultrasonic transmitters. The distance between adjacent ultrasonic transmitters in the series is more than one meter. Transmitters may still be installed with an outlay even along a path of up to several hundred meters. The actual measurement may only require the two nearest or only very few transmitters in the vicinity of the object to be located.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 6 shows method steps for calculating the position of the identification unit.

DETAILED DESCRIPTION OF THE DRAWINGS

Figure 1:
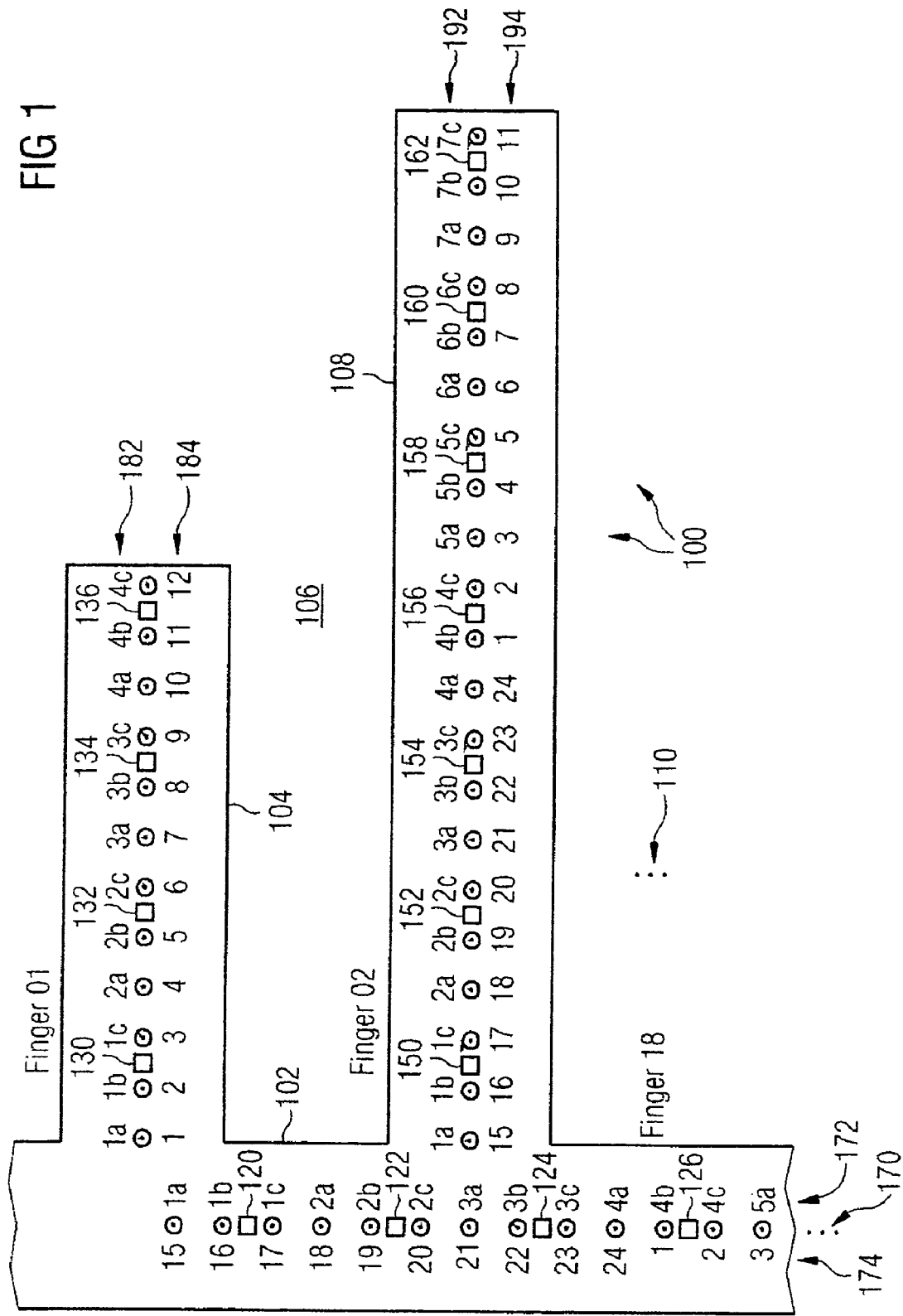
FIG. 1 shows the division of a building area according to the linear concept taking account of a cluster condition.

Although the disclosure is explained below on the basis of a batch tracking system in semiconductor manufacturing, the disclosure may also be used in other areas, e.g. in mechanical engineering or in libraries. Although reference is made below to straight aisles, the disclosure may also be used in the case of path sections that are linear piece by piece.

The combination of radio and ultrasonic technology resolves the conflict between efficient communication and accurate localization, i.e. the performance both of the communication and of the localization is very high. When using ultrasound (US), the challenge is as far as possible not to permit the time-critical processing of the ultrasonic signals to be of significance. The speed of sound is approximately 340 m/s in contrast to the speed of light, at which radio beams propagate. For determining an item of analog location information by means of ultrasound, it must be ensured that a US receiver in an identification unit or DisTag does not simultaneously receive two US signals whose origin cannot be differentiated. It follows from this that, in accordance with an anticollision condition, US transmitters are not permitted to transmit simultaneously which lie within a specific proximity region whose extent is crucially determined by the range of the ultrasonic transmitter and by the reception sensitivity of the US receivers over the angle, and which transmit within a specific time determined by a predetermined maximum time until the arrival of a US signal.

It is thus necessary to avoid the situation in which two US signals are received within this time limit and an assignment of the signal to a specific US transmitter is not possible. In the case of a performance requirement of e.g. "every 30 seconds updating of the spatial positions of all batch boxes", a plurality of ultrasonic transmitters have to be driven simultaneously without the signals colliding with one another. This is achieved by all of the US transmitters that are driven simultaneously being assigned to a common cluster. The method is based on giving a minimum geometrical distance between the simultaneously transmitting US transmitters of a cluster. This condition is also referred to as cluster condition below. The optimum design of the cluster condition, i.e. the selected distance between two US transmitters of a cluster, is determined by the anticollision condition and the quality of the coarse localization by radio, because the DisTag or US receiver can assign a received propagation time only in blanket fashion to all the antennas of a cluster. The assignment to a region during the coarse locating is effected e.g. by the knowledge of the position of the radio antenna with the strongest reception level of a signal coming from the DisTag to be located.

Moreover, it must be taken into consideration that the number of US transmitters transmitting successively in 30 seconds must be small since otherwise too little "radio time" is available in the e.g. synchronous communication protocol for the feedback of the propagation times and the identification numbers by the DisTags:

the communication between a connection unit (explained in greater detail below) and the DisTags.

The time for transmitting the US signals including subsequent propagation time measurement amounts to only a quarter of a cycle.

The consequence of these restrictions is that not all of the US transmitters can be differentiated by way of the temporal position of their emission of ultrasound in the communication protocol. Thus, an absolute localization solely on the basis of US propagation times is not possible. Therefore, a coarse localization is carried out by radio field strength measurement, i.e. an absolute coordinate, and the fine localization is carried out via the propagation time measurement by ultrasound, i.e. determining a relative coordinate.

FIG. 1 shows the division of a building area of a factory building 100 according to the linear concept taking account of a cluster condition. The factory building 100 is classified, according to the linear concept, into a main aisle 102 and into transverse aisles 104, 108 and also into further transverse aisles 110 indicated by dots. On account of the maximum available time for a localization, which is 30 seconds in the exemplary embodiment, and the condition that all ultrasonic transmitters have to be switched three times in a cycle for redundancy reasons, the result is a maximum cluster number of 36.

In each case, three ultrasonic transmitters a, b and c are combined per radio antenna 120 to 162, adjacent ultrasonic transmitters 1a to 7b in each case being at a distance of 1.6 meters, as will be explained in greater detail below with reference to FIG. 2. With these preconditions, a maximum of 12 radio antennas with in each case three ultrasonic transmitters can be switched through three times per cycle in an aisle. Through the use of clusters 1 to 24, however, the ultrasonic transmitters of the same cluster can be switched simultaneously. A radio antenna 120 to 162 and three ultrasonic antennas or ultrasonic transmitters 1a to 7b are referred to as a device hereinafter.

The main aisle 102 is numbered as finger "18". The transverse aisle 104 is numbered as finger "01". The transverse aisle 104 is numbered as finger "02", etc. As a result, it is possible to form identifications for the designation of an ultrasonic antenna, e.g. the identification 013a, for designating the first ultrasonic transmitter a in the third device of the transverse The main aisle 102 and the transverse aisles 104, 106, 110 all have a width of e.g. 2.80 meters and the main aisle 102 has a length of 38 meters. The transverse aisle 104 has a length of 19.2 meters and the transverse aisle 108 has a length of 33 meters.

The devices with the radio antennas 120 to 126 and also further devices 170 (not illustrated) are arranged in the main aisle 102. The ultrasonic transmitters are designated in a row 172, beginning with 1a, 1b, 1c, 2a, 2b, and others. A row 174 serves for representing numbers that specify the cluster association of the ultrasonic transmitters in the main aisle 102. Thus, the ultrasonic transmitter 1a is associated with the cluster 15, the ultrasonic sensor 1b is associated with the cluster 16, etc. Only 24 of the at most 36 possible clusters are used, so that, in the main aisle 102, the ultrasonic transmitter 4b is associated with the cluster 1 and the ultrasonic transmitter 4c is associated with the cluster 2, The transverse aisle 106 branches off from the main aisle 102 at the ultrasonic transmitter 1a of the main aisle 102. The first ultrasonic transmitter 1a in the transverse aisle 104 is assigned to the cluster 1, resulting in small influences on the ultrasonic signals of different aisles on account of the offset during the transmission of the ultrasonic pulses. Equally, the first ultrasonic sensor 1a of the transverse aisle 108 is assigned to a different cluster, namely the cluster 15, then the ultrasonic transmitters 2c, 3a, 3b of the main aisle 102 that are closest to said ultrasonic transmitter 1a, these ultrasonic transmitters assigned to the cluster 20, 21 and 22, respectively. The ultrasonic transmitters of the clusters 1 to 24 are driven in ascending order.

The devices with the radio antennas 130 to 136 are arranged in the transverse aisle 104. The ultrasonic transmitters are designated in a row 182, beginning with 1a, 1b, 1c, 2a, 2b, etc. to 4c. A row 184 serves to represent numbers that specify the cluster association of the ultrasonic transmitters in the main aisle 102. Thus, the ultrasonic transmitter 1a is associated with the cluster 1 and the ultrasonic sensor 1b is associated with the cluster 2, etc.

The devices with the radio antennas 150 to 162 are arranged in the transverse aisle 108. The ultrasonic transmitters are designated in a row 192, beginning with 1a, 1b, 1c, 2a, 2b, etc. to 7b. A row 194 serves to represent numbers that specify the cluster association of the ultrasonic transmitters in the main aisle 102. Thus, the ultrasonic transmitter 1a is associated with the cluster 15 and the ultrasonic sensor 1b is associated with the cluster 16, etc. Only 24 of the at most 36 possible clusters are used, so that, in the transverse aisle 108, the ultrasonic transmitter 4b is associated with the cluster 1 and the ultrasonic transmitter 4c is associated with the cluster 2, etc.

Between the transverse aisles 104 and 108, too, the arrangement works with a cluster offset in order to avoid disturbances of the ultrasonic measurements. The offset amounts to ten clusters, so that nine ultrasonic transmitters of an aisle always lie between the respectively simultaneously transmitting ultrasonic transmitters of a cluster in the event of a parallel displacement of one aisle to the other aisle.

Figure 2:
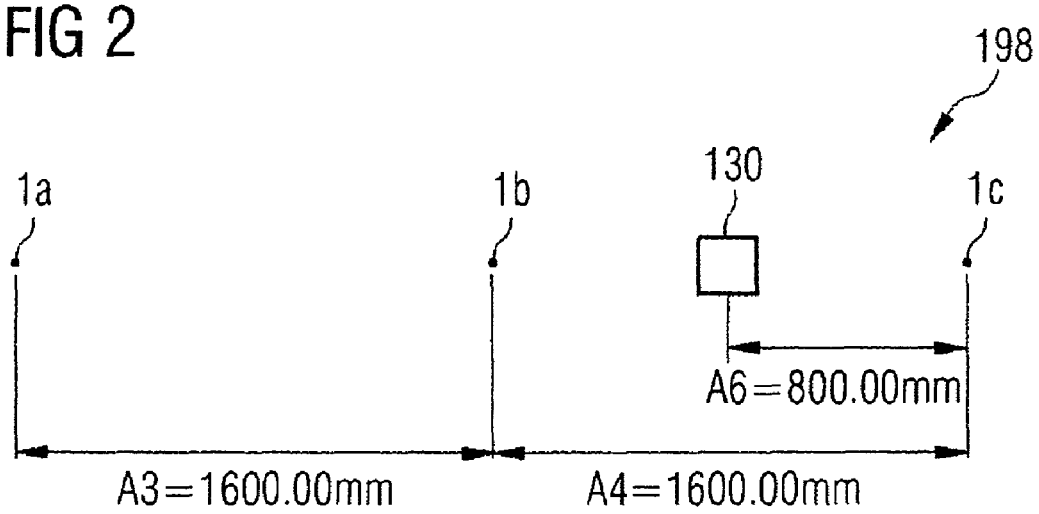
FIG. 2 shows a section of a locating arrangement that forms a device.

FIG. 2 shows a locating arrangement 198, forming the device with the radio antenna 130, in a manner representative of the arrangement of the mutually identically constructed devices 120 to 162, 170, 180 and 190. The devices of an aisle are arranged one after the other along a straight line. The devices may be mounted on a ceiling or a wall.

There is a distance A3 of 1.6 meters between the ultrasonic transmitter 1a and the ultrasonic transmitter 1b. There is equally a distance A4 of 1.6 meters between the ultrasonic transmitter 1b and the ultrasonic transmitter 1c. The radio antenna 130 is arranged at a distance A6 of 0.8 meter from the ultrasonic transmitter 1c and thus lies precisely in the center between the ultrasonic transmitters 1b and 1c. The radio antenna 132 of the adjacent device is at a distance of 4.8 meters from the radio antenna 130.

Figure 3:
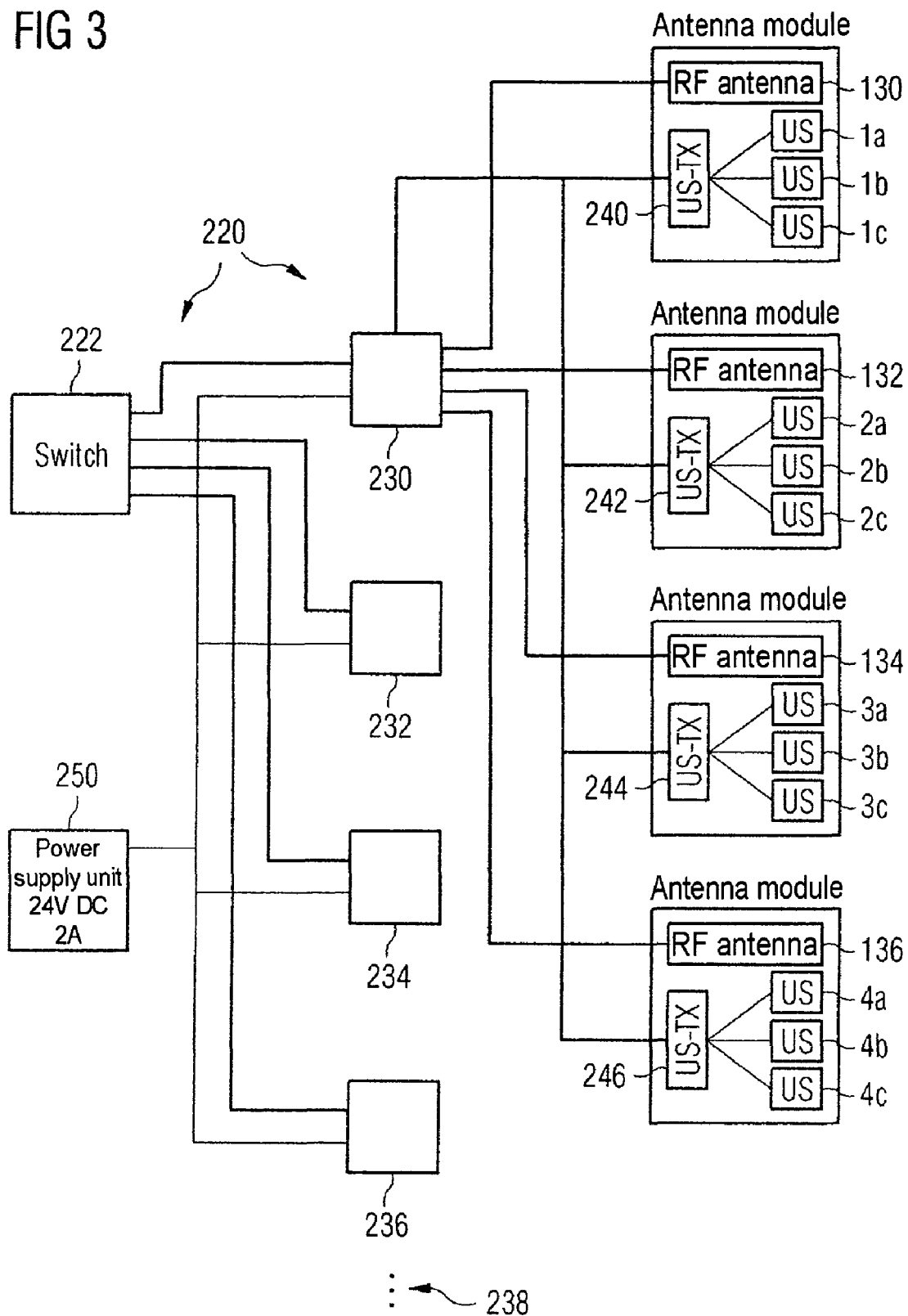
FIG. 3 shows constituent parts of a drive and evaluation unit.

FIG. 3 shows constituent parts of a drive and evaluation unit 220, which contains the following components besides a data processing system (not illustrated) e.g. based on the operating system Windows 2000:

a so-called switch 222 of a data transmission network at which the data processing system is operated as well;

a plurality of connection units connected to the switch 222, four connection units 230 to 236 of which are illustrated in FIG. 3 further connection units 238 connected to the switch 236 are indicated by dots);

a plurality of devices or antenna modules with a respective radio antenna 130 to 136 and in each case three ultrasonic transmitters, in each case four devices being connected to a connection unit 230 to 238;

drive units 240 to 246 that are contained in a respective device or antenna module and in each case drive the three ultrasonic transmitters of a device, e.g. the drive unit 240 of the device with the radio antenna 130 drives the ultrasonic transmitters 1a, 1b and 1c; and a power supply unit 240 for supplying power to the connection units 230 to 238 and the drive units 240 to 246.

Figure 4:
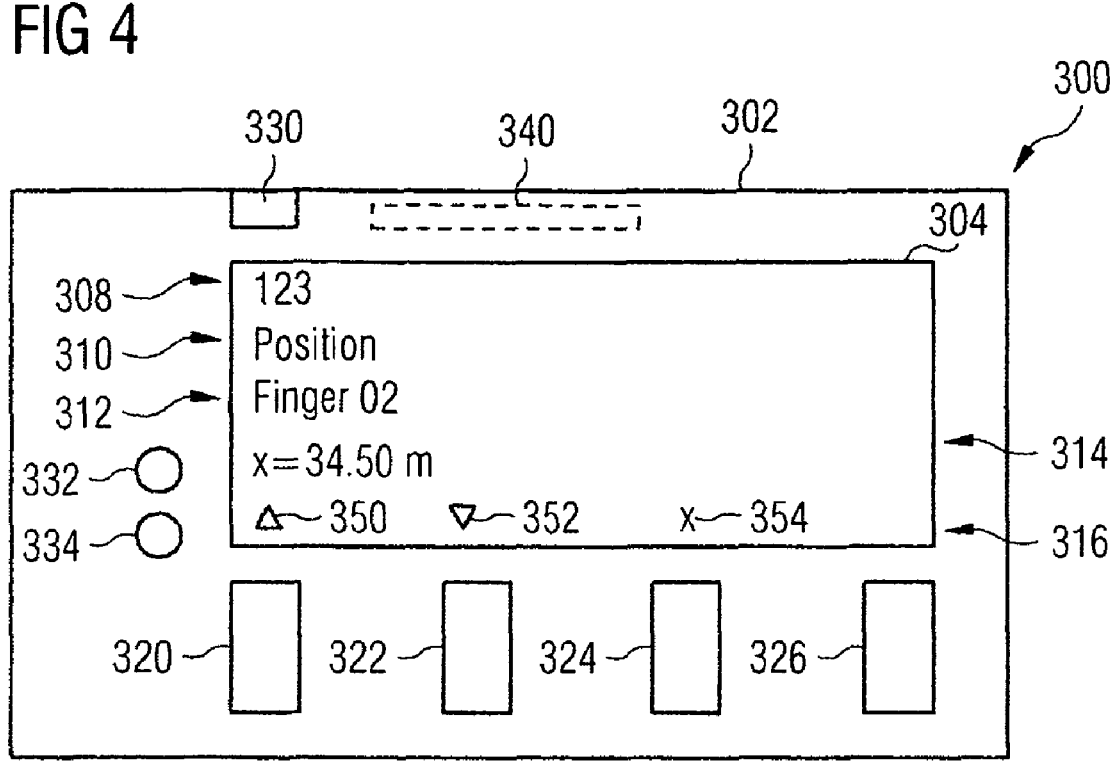
FIG. 4 shows an identification unit whose location is to be determined.

FIG. 4 shows an identification unit 300 or a DisTag having a housing 302, to which is fitted a display 304 for representing five lines 308 to 316 of alphanumeric text. The identification unit 300 additionally also contains four operating keys 320 to 326 that may function as menu selection keys.

Furthermore, the identification unit 300 contains an ultrasonic receiver 330, with the aid of which the propagation time measurement is carried out. Two light-emitting diodes 332 and 334 serve for the identification of batch boxes sought and the identification of urgent batches, respectively. The identification unit additionally contains a transmitting/receiving antenna 302 for communication with the radio antennas 120 to 162. The identification unit 300 is fed by an internal battery, an accumulator and, possibly, by a solar cell. Situated within the identification unit 300 is a circuit that provides the functions of the identification unit, in particular:

the propagation time measurement, including a synchronization, the transmission of the results of the propagation time measurement, and the reception of messages that are represented on the display 304.

In FIG. 4, the identification of the identification unit 300 is displayed in the top left corner of the display 304 or in the line 308. In the exemplary embodiment, the identification "123" is displayed, corresponding to a batch number.

In the display 304, line 310, the word "position" is represented in the current menu selection. Line 312 contains the text "finger 02", i.e. the specification of the finger or transverse aisle 108 in which the identification unit 300 is currently situated.

The fourth line 314 displays the text "x=34.50 m" because a distance of 34.50 meters between the identification unit 300 and the start of the transverse aisle 108 has been determined. The fifth line 316 serves for displaying control symbols 350 to 354 for operating the identification unit 300.

Figure 5:
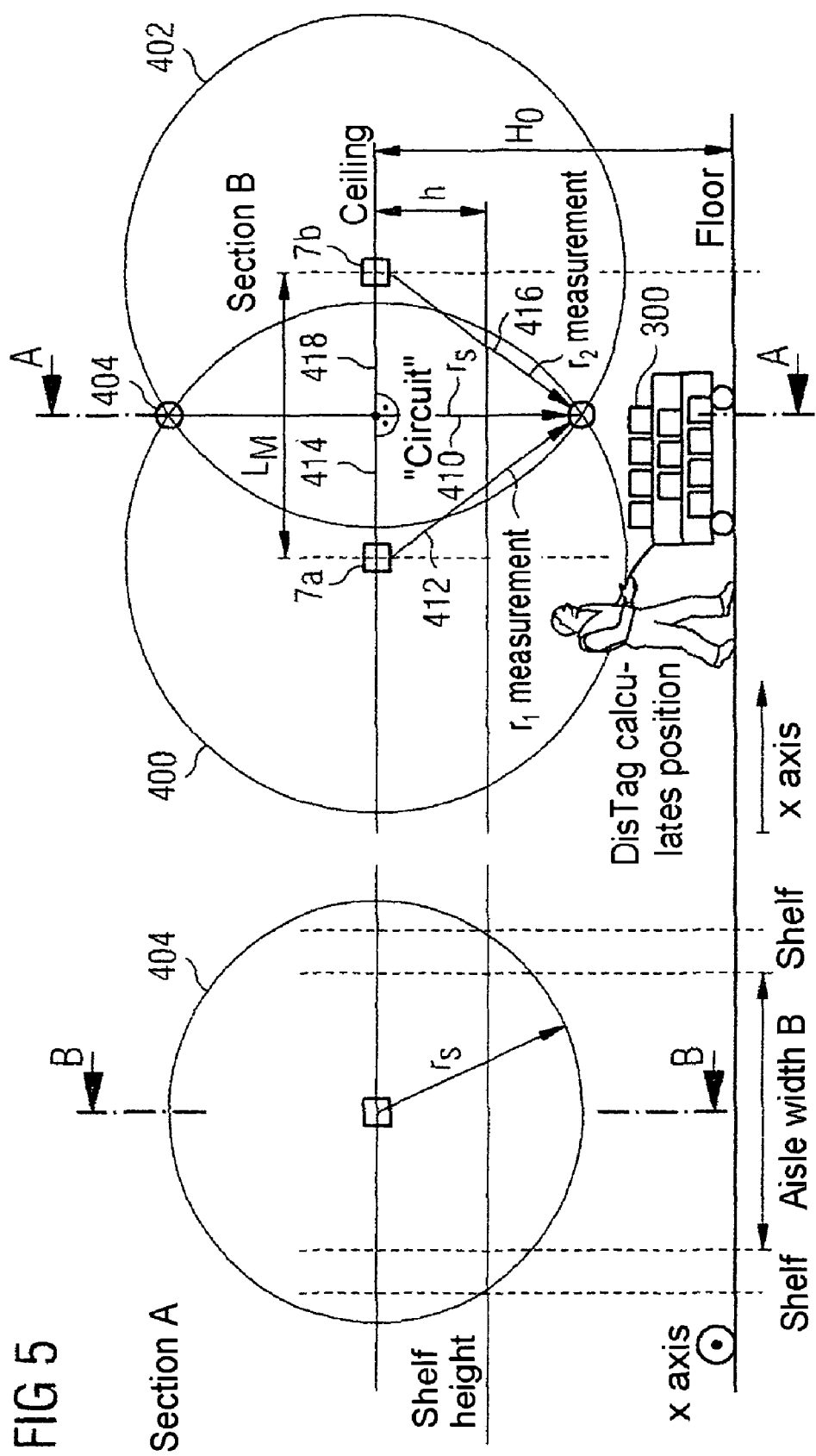
FIG. 5 shows the trigonometrical basic principle for determining the linear position.

FIG. 5 shows the trigonometrical basic principle for determining the linear position. In order to achieve a maximum performance, i.e. a maximum communication rate and at the same time an accurate localization, with the batch tracking system, the US transmitter density, i.e. the number of US transmitters per unit area, must be reduced as far as possible. For this reason, a collinear arrangement of the US transmitters in the longitudinal direction of the fingers/aisles 104, 106, 108 is effected, in the case of which only the position in the longitudinal direction of the finger/aisle 104, 106, 108 is specified precisely and unambiguously.

The intersection of two spheres 400 and 402, whose radius is calculated from the US propagation time between a US transmitter 7a and the identification unit 300 and between a further US transmitter 7b and the identification unit 300, yields a ring 404 that is perpendicular to the longitudinal axis of the finger or aisle. The distance from the respective transmitter is determined from each propagation time by means of the formula:

propagation time * US speed=distance.

At 21 degrees Celsius, the propagation time amounts to 343.96 m/s (meters per second).

The US transmitters are for example, adjacent US transmitters or transmitters separated only by one intervening ultrasonic transmitter, such as the US transmitters 7a and 7b in the transverse aisle 108, i.e. in the finger "02". The spheres 400, 402 may have the same radius r1, r2 as the identification unit is currently situated precisely halfway between the US transmitters 7a and 7b. At other positions, the spheres 400, 402 have mutually different radii. The following geometrical considerations hold true, however, for all sphere radii r1, r2. Therefore, with the "linear concept", in principle two US propagation times suffice for calculation of the precise position of an identification unit 300.

The US transmitters are arranged at a fixed distance L of in each case 1.6 meters in the center of the transverse aisle 108 parallel to the aisle direction. If two propagation time measurements of two US transmitters with a defined distance LM are present for a DisTag 300, in which case LM=L * n holds true, where n is a natural number, then it is possible to calculate the position of the DisTag 300 in the transverse aisle 108 by formulating Pythagoras' theorem for the right-angled triangles made from the sections 410, 412 (distance between DisTag 300 and the transmitter 7a determined from the propagation time of the ultrasonic pulse coming from the transmitter 7a) and 414 and also the sections 410, 416 (distance between DisTag 300 and the transmitter 7b determined from the propagation time of the ultrasonic pulse coming from the transmitter 7b) and 418. The section 414 designates the x distance from the transmitter 7a. The section 418 designates the x distance from the transmitter 7b.

The sections 414 and 418 depend on one another by way of the distance LM and the position x, in which case in FIG. 5 the following holds true for the length of the section 414 equal to x:

length of the section 414=LM−x. The length of the section 410 does not have to be determined. The position x can thus be calculated from the relationships specified. The calculation is independent of the y position (laterally transverse with respect to the longitudinal axis) or the z position (height) of the identification unit 300 in the transverse aisle 108.

Errors in determining the positions can be avoided if the location is calculated repeatedly for an identification unit per cycle. A valid value is defined only upon correspondence of the locations determined of an identification unit. By way of example, the main cycle of 30 seconds is therefore subdivided once again into three subcycles each of 10 seconds. By virtue of this procedure, identification units 300 currently in motion can be exempted from the locating until the end of the movement. Moreover, reflections and other sources of disturbance thus influence the results to a lesser extent.

FIG. 6 shows method steps for calculating the position of the identification unit. In method steps 500 and 502, the propagation time is determined by an identification unit and reported to the central data processing system via the radio antennas 120 to 162. In the method step 500, the propagation time of the received US signals is determined by the DisTag. For example, the DisTag 300 having the ID (identifier) 123 determines a propagation time of 12 ms in the time slot 13 and a propagation time of 14 ms in the time slot 18. The time slot 13 relates e.g. to the US transmitter 7a and the time slot 18 relates e.g. to the US transmitter 7b in the transverse aisle 108. In the method step 502, the propagation times determined are transmitted to the data processing system in the form of a telegram via radio.

In a subsequent method step 504, the field strengths are determined by the connection units 230 to 238. By way of example, the radio antenna 162 or, with the nomenclature introduced above, the antenna RF 0207 receives a reception signal from the DisTag 300 with a level of 45 dB. The antenna with the second strongest reception level may be the antenna 160, i.e. the antenna RF 0206, with a reception level of 30 dB.

Afterward, in method steps 506 to 510, a coarse localization is carried out by the data processing system, which is also referred to as a BTS server (box tracking server). In the method step 506, a check is made to ascertain whether the field strength of the strongest reception level exceeds the field strength of the second strongest reception level by 10 dB. If this is the case, then the method step 506 is followed directly by the method step 508, in which a telegram of a DisTag is assigned to an RF antenna in the layout of the factory building. The telegram of the DisTag 300 may be assigned to the US transmitter 1a at the RF antenna 7 or 162 in the finger or 108. By contrast, if it is ascertained in the method step 506 that the level condition is not fulfilled, then a different localization method is used or the next reception of a telegram from the relevant DisTag is awaited.

In the subsequent method steps 512 and 514, the fine localization is carried out by the BTS server. In the method step 512, the BTS server determines the antenna 162 on the basis of the layout data of the factory building 100, see FIG. 1. In the subsequent method step 514, the BTS server carries out the calculations explained with reference to FIG. 5. During the calculation, the simpler method with only two propagation times is carried out in place of a trilateration. The locating text "finger 02; x=34.5 m" is created by the Method steps 516 to 520 are then carried out, in which a publication decision is taken by the BTS server. In the method step 516, a check is made to ascertain whether the position of the DisTag 300 has changed since the last cycle. If the position of the DisTag 300 has changed, then in the method step 518, the position is updated in a database and the locating text is transmitted to the DisTag 300. By contrast, if the position has remained the same, then the method step 516 is followed directly by the method step 520, in which an updating of the database and a publication of the locating text do not occur.

The communication of the propagation times of e.g. up to 2000 DisTags is carried out e.g. according to the known slotted ALOHA method. By way of example, 100 time slots per cycle are subdivided into in each case 20 sub-time slots. Each DisTag transmits in a randomly determined time slot, so that, because of the resulting uniform distribution, despite identically constructed and identically operating DisTags, the DisTags can for the most part transmit the propagation times determined. Absent messages can be avoided by virtue of the redundancy mentioned above. As an alternative, however, use is also made of a method in which each DisTag is assigned a dedicated sub-time slot.

It is therefore intended that the foregoing detailed description be regarded as illustrative rather than limiting, and that it be understood that it is the following claims, including all equivalents, that are intended to define the spirit and scope of this invention.

The invention claimed is:

1. A locating arrangement comprising: a plurality of ultrasonic transmitters arranged along a path;
   at least one electromagnetic radiation receiver;
   at least one identification unit comprising an ultrasonic receiver and an electromagnetic radiation transmitter; and
   an evaluation unit;
   wherein the distance between adjacent ultrasonic transmitters of the plurality of ultrasonic transmitters is greater than one meter;
   wherein the evaluation unit is operable to determine a location with a coarse resolution depending on a reception signal on the at least one electromagnetic radiation receiver, said reception signal having been sent by the electromagnetic radiation transmitter of the at least one identification unit; and
   wherein the evaluation unit is further operable to carry out a finer spatial resolution relative to the coarse resolution based on a propagation time measurement determined with the aid of at least two ultrasonic transmitters of the plurality of ultrasonic transmitters and the ultrasonic receiver of the at least one identification unit.

2. The locating arrangement as claimed in claim 1 wherein the ultrasonic transmitters of the plurality of ultrasonic transmitters are arranged at mutually uniform distances between mutually adjacent transmitters of the plurality of ultrasonic transmitters, the mutually uniform distances being in the range of from one meter to three meters, and wherein the ultrasonic transmitters of the plurality of ultrasonic transmitters are arranged along a straight section.

3. The locating arrangement as claimed in claim 2 wherein the mutually uniform distances are approximately 1.5 meters to two meters.

4. The locating arrangement as claimed in claim 1 wherein the ultrasonic transmitters of the plurality of ultrasonic transmitters are arranged along an aisle.

5. The locating arrangement as claimed in claim 4 wherein the ultrasonic transmitters of the plurality of ultrasonic transmitters are arranged along an aisle in a factory building.

6. The locating arrangement as claimed in claim 5 wherein semiconductor wafers or other substrates for integrated electronic circuits are processed in the factory building.

7. The locating arrangement as claimed in claim 1 further comprising a drive unit operable to drive the plurality of ultrasonic transmitters based on a pulsed operating mode in which ultrasonic pulses are transmitted between transmission pauses.

8. The locating arrangement as claimed in claim 1 further comprising a drive unit operable to work cyclically and generate for the plurality of ultrasonic transmitters drive signals that instigate a transmission of ultrasonic pulses,
   wherein a cycle of the drive unit comprises at least two sections, a different portion of the plurality of ultrasonic transmitters being driven in each of the at least two sections,
   and wherein the drive unit comprises a plurality of group drive units, said plurality of group drive units generating the drive signals for the plurality of ultrasonic transmitters depending on an input signal.

9. The locating arrangement as claimed in claim 8, further comprising at least three further ultrasonic transmitters arranged along a further path.

10. The locating arrangement as claimed in claim 9 wherein the at least three further ultrasonic transmitters are arranged along a further straight section and at mutually identical distances between mutually adjacent ultrasonic transmitters of the at least three further ultrasonic transmitters, wherein the path and the further path lie parallel or transversely with respect to one another.

11. The locating arrangement as claimed in claim 9, wherein the path and the further path are arranged parallel to one another, and wherein one path of the path and the further path, in the event of a parallel displacement, overlaps the other path of the path and the further path completely or over at least 50 percent of a length of the further path.

12. The locating arrangement as claimed in claim 11, wherein at least one ultrasonic transmitter of the plurality of ultrasonic transmitters on the path and at least one ultrasonic transmitter of the at least three further ultrasonic transmitters on the further path transmit simultaneously, and wherein more than one ultrasonic transmitter lies between the at least two ultrasonic transmitters transmitting simultaneously after a parallel displacement.

13. The locating arrangement as claimed in claim 11 wherein a region into which no ultrasonic signal of the ultrasonic transmitters of the plurality of ultrasonic transmitters and of the at least three further ultrasonic transmitters or only a greatly attenuated ultrasonic signal of the ultrasonic transmitters of the plurality of ultrasonic transmitters and of the at least three further ultrasonic transmitters penetrates between the path and the further path.

14. The locating arrangement as claimed in claim 8 further comprising at least three further ultrasonic transmitters arranged along a straight main path at mutually identical distances between mutually adjacent ultrasonic transmitters of the at least three further ultrasonic transmitters, wherein the straight main path lies transversely with respect to at least two secondary paths, in particular at an angle of 90 degrees.

15. The locating arrangement as claimed in claim 14 wherein the straight main path lies at an angle of 90 degrees with respect to the at least two secondary paths.

16. The locating arrangement as claimed in claim 14 further comprising at least two further electromagnetic radiation receivers, wherein the at least two further electromagnetic radiation receivers and the at least one electromagnetic radiation receiver are strung along a reciever straight path at mutually identical receiver distances between mutually adjacent electromagnetic radiation receivers of the at least two further electromagnetic radiation receivers and the at least one electromagnetic radiation receiver, wherein the mutually identical receiver distance between mutually adjacent electromagnetic radiation receivers is at least twice as large as the distance between mutually adjacent ultrasonic transmitters of at least one of the plurality of ultrasonic transmitters and the at least three further ultrasonic transmitters, and the mutually identical receiver distance between mutually adjacent electromagnetic radiation receivers is less than five times the distance between mutually adjacent ultrasonic transmitters of at least one of the plurality of ultrasonic transmitters and the at least three further ultrasonic transmitters.

17. The locating arrangement as claimed in claim 16, wherein the mutually identical receiver distance comprises at least one of a distance greater than three meters and less than seven meters, a distance greater than four meters and less than 5.5 meters, and a distance of 4.8 meters, or wherein the at least one electromagnetic radiation receiver and the at least two further electromagnetic radiation receivers are arranged on a first section and at least one of the plurality of ultrasonic transmitters and the at least three further ultrasonic transmitters are arranged on the first section, wherein one electromagnetic radiation receiver of the at least one electromagnetic radiation receiver and the at least two further electromagnetic radiation receivers is arranged between two ultrasonic transmitters of the plurality of ultrasonic transmitters and the at least three further ultrasonic transmitters at the same distance from the two ultrasonic transmitters.

18. The locating arrangement as claimed in claim 17 further comprising a plurality of connection units, wherein at each connection unit of the plurality of connection units a plurality of antenna modules are operated, each antenna module of the plurality of antenna modules containing a reception antenna and a plurality of ultrasonic transmitters, and wherein the plurality of connection units are connected via a local data transmission network.

19. The locating arrangement as claimed in claim 17 further comprising at least 500 identification units having mutually different identifications and being arranged in an acoustic irradiation range of the ultrasonic transmitters of at least one of the plurality of ultrasonic transmitters and the at least three further ultrasonic transmitters, wherein the at least 500 identification units are fixed to a receptacle container for a plurality of substrates for integrated circuits.

20. A location determining method comprising:
constructing a locating arrangement comprising a plurality of ultrasonic transmitters along at least one path;
constructing at least two electromagnetic radiation receivers, said at least two electromagnetic radiation receivers receiving radiation from at least one region irradiated with sound by an ultrasonic transmitter of the plurality of ultrasonic transmitters;
introducing at least one identification unit into a region irradiated with sound by at least two ultrasonic transmitters of the plurality of ultrasonic transmitters, the at least one identification unit comprising an ultrasonic receiver and an electromagnetic radiation transmitter;
carrying out an ultrasonic propagation time measurement from the at least two ultrasonic transmitters of the plurality of ultrasonic transmitters to the at least one identification unit and determining at least one propagation time datum;
determining a fine position of the at least one identification unit depending on the propagation time datum;
determining a coarse position of the at least one identification unit using the at least two electromagnetic radiation receivers and the electromagnetic radiation transmitter of the at least one identification unit; and
combining the fine position and the coarse position to form a location datum.

21. The method as claimed in claim 20 further comprising:
carrying out the ultrasonic propagation time measurement in the at least one identification unit;
communicating the propagation time datum from the at least one identification unit via an electromagnetic radiation receiver of the at least two electromagnetic radiation receivers to an evaluation unit, wherein the evaluation unit determines the location datum; and
determining the coarse position based on a reception intensity upon reception of the propagation time datum at the at least two electromagnetic radiation receivers.

22. The method as claimed in claim 20 further comprising using the locating arrangement comprising: a plurality of ultrasonic transmitters arranged along a path;

at least one electromagnetic radiation receiver;
at elast one identification unit comprising an ultrasonic receiver and an electromagnetic radiation transmitter; and
an evaluation unit;
wherein the distance between adjacent ultrasonic transmitter of the plurality of ultrasonic transmitter is greater than one meter;
wherein the evaluation unit is operable to determine a location with a coarse resolution depending on a reception signal on the at least one electromagnetic radiation receiver, said reception signal having been sent by the electromagnetic radiation transmitter of the at least one identification unit; and
wherein the evaluation unit is further operable to carry out a finer spatial resolution relative to the coarse resolution based on a propagation time measurement determined with the aid of at least two ultrasonic transmitters of the plurality of ultrasonic transmitters and the ultrasonic receiver of the at least one identification unit.

23. The method as claimed in claim 20 further comprising:
determining the fine position by trigonometrical calculations in a plane containing a section, wherein the plurality of ultrasonic transmitters are arranged in the section, and wherein the section contains the at least one identification unit; and
determining a fine position by one spatial coordinate.

24. A batch box localization system comprising a locating arrangement operable to detect transport paths for a plurality of batch boxes between a plurality of manufacturing installations and locates the batch boxes with an accuracy of less than two meters, wherein the locating arrangement as claimed in claim 1 is used.

25. The batch box localization system as claimed in claim 24 further comprising a communication system that outputs at least one of manufacturing data or transport data to output units fixed to the batch boxes.

26. The batch box localization system as claimed in claim 24 further comprising a communication system that outputs manufacturing data and transport data to output units fixed to the batch boxes.

27. A locating arrangement comprising:
(a) a plurality of ultrasonic transmitters arranged along a path;
(b) at least three electromagnetic radiation receivers arranged along the path;
(c) a drive unit operable to work cyclically and generate for the plurality of ultrasonic transmitters drive signals that instigate a transmission of ultrasonic pulses, the drive unit comprising a plurality of group drive units that generate the drive signals for the plurality of ultrasonic transmitters depending on an input signal;
(d) at least three further ultrasonic transmitters arranged along a straight main path at mutually identical distances between mutually adjacent ultrasonic transmitters of the at least three further ultrasonic transmitters;
(e) at least one identification unit comprising an ultrasonic receiver and an electromagnetic radiation transmitter; and
(f) an evaluation unit operable to determine a location with a coarse resolution depending on a reception signal at the at least three electromagnetic radiation receivers;
wherein the straight main path lies transversely with respect to at least two secondary paths at an angle of 90 degrees;
wherein a transmitter distance between adjacent ultrasonic transmitters of the plurality of ultrasonic transmitters is greater than one meter;
wherein a cycle of the drive unit comprises at least two sections, a different portion of at least one of the plurality of ultrasonic transmitters and the least three further ultrasonic transmitters being driven in each of the at least two sections;
wherein the at least three electromagnetic radiation receivers are strung along a straight path at mutually identical receiver distances between mutually adjacent electromagnetic radiation receivers, wherein the mutually identical receiver distance is at least twice as large as the transmitter distance, and the mutually identical receiver distance is less than five times the transmitter distance; and
wherein the evaluation unit is further operable to carry out a finer spatial resolution relative to the coarse resolution based on a propagation time measurement determined with the aid of at least two ultrasonic transmitters of the plurality of ultrasonic transmitters; and
wherein the at least three electromagnetic radiation receivers are operable to receive data from the at least one identification unit to be located.

* * * * *